United States Patent
Huemoeller

(10) Patent No.: US 8,261,989 B2
(45) Date of Patent: Sep. 11, 2012

(54) METHOD FOR GENERATING IMAGE INFORMATION

(75) Inventor: Hans Huemoeller, Babenhausen (DE)

(73) Assignee: Dr. Wirth Grafische Technik GmbH & Co. KG (DE)

( * ) Notice: Subject to any disclaimer, the term of this patent is extended or adjusted under 35 U.S.C. 154(b) by 497 days.

(21) Appl. No.: 12/301,987

(22) PCT Filed: May 7, 2007

(86) PCT No.: PCT/DE2007/000822
§ 371 (c)(1),
(2), (4) Date: Dec. 7, 2009

(87) PCT Pub. No.: WO2007/134567
PCT Pub. Date: Nov. 29, 2007

(65) Prior Publication Data
US 2010/0238525 A1    Sep. 23, 2010

(30) Foreign Application Priority Data

May 24, 2006  (DE) .......................... 10 2006 024 864
Jul. 7, 2006   (DE) .......................... 10 2006 031 833

(51) Int. Cl.
*G06K 7/10* (2006.01)

(52) U.S. Cl. .................................. 235/462.14

(58) Field of Classification Search ............ 235/462.14, 235/462.01, 462.1, 462.15, 494
See application file for complete search history.

(56) References Cited

U.S. PATENT DOCUMENTS

| 4,158,507 A | 6/1979 | Himmel |
| 5,198,877 A | 3/1993 | Schulz |
| 5,251,156 A | 10/1993 | Heier et al. |
| 5,850,289 A | 12/1998 | Fowler et al. |
| 6,054,712 A | 4/2000 | Komardin et al. |
| 6,611,617 B1 | 8/2003 | Crampton |
| 6,616,044 B1 * | 9/2003 | Gu ........................ 235/462.14 |
| 7,748,631 B2 * | 7/2010 | Patel et al. ............ 235/462.14 |

FOREIGN PATENT DOCUMENTS

| DE | 4434042 A1 | 3/1996 |
| DE | 19721688 A1 | 9/1998 |
| DE | 102004033928 A1 | 2/2006 |
| DE | 102004047928 A1 | 4/2006 |

OTHER PUBLICATIONS

International Searching Authority, International Search Report for International Application No. PCT/DE2007/000822, mailed Sep. 20, 2007, 3 pages, European Patent Office, The Netherlands.
International Searching Authority, Written Opinion for International Application No. PCT/DE2007/000822, mailed Sep. 20, 2007, 16 pages, European Patent Office, Germany.
The International Bureau of WIPO, International Preliminary Report on Patentability for Application No. PCT/DE2007/000822, mailed Jan. 20, 2009, 18 pages, Switzerland.
Fabio, Remondino, "From Point Cloud To Surface: The Modeling and Visualization Problem," International Archives of Photogrammetry, Remote Sensing and Spatial Information Sciences, Feb. 2003, 11 pages, vol. XXXIV-5/W10, Switzerland.

* cited by examiner

*Primary Examiner* — Seung Lee
(74) *Attorney, Agent, or Firm* — Alston & Bird LLP

(57) ABSTRACT

A method for generating image information from an object to be scanned by means of a scanning device, wherein the object to be scanned can comprise one or a plurality of surfaces, one or a plurality of bodies and/or a space, wherein the scanning device or at least parts of the scanning device or the object itself is moved during the scanning operation, and wherein the object to be scanned is scanned by the scanning device in the region of a scanning layer, is configured with regard to a simplest possible scanning operation in such a way that the beam path that scans the object is set in a manner oriented at any desired angle with respect to the scanning layer, and/or that the scanning layer is chosen in any desired position with respect to the object to be scanned.

13 Claims, No Drawings

METHOD FOR GENERATING IMAGE INFORMATION

The invention concerns a method for generation of image information from an object being scanned by means of a scanning device, in which the object being scanned can include one or more surfaces, one or more bodies and/or a space, in which the scanning device, or at least parts of the scanning device, or the object itself are moved during the scanning process, and in which the object being scanned is scanned by the scanning device in the area of a scanning layer.

In many areas of digital processing, it is necessary to initially extract image information from a physically present object. For this purpose, the object is scanned by means of an appropriate scanning device and made available in a form appropriate for a digital computer. Such image information is required, for example, in three-dimensional animations, in CAD systems or for measuring objects. On the other hand, by combination of two-dimensional information (color) with three-dimensional information (shape), a two-dimensional depiction can be generated, which cannot be distinguished by the human eye from a three-dimensional original, or at least not at first glance.

For this purpose, the object being scanned, which can include one or more surfaces, one or more bodies and/or a space, is scanned by a variety of methods. The simplest systems use light-sensitive elements that detect the light reflected by the illuminated object and generate brightness and/or color values from it. Two-dimensional image information can be obtained on this account in a simple fashion. In addition, more complex systems are known for producing two-dimensional image information. Camera systems can be referred to here merely as an example.

Several cameras, whose images are combined by triangulation methods to three-dimensional information, can be used in the generation of three-dimensional image information. Other methods use laser beams that are directed onto the object being scanned and reflected by it. By measurement of the travel time of the laser beam, a conclusion can be drawn concerning the distance of the illuminated point from the scanning head and three-dimensional image information extracted from this. In addition, confocal systems are used, in which a light beam is focused onto the surface being scanned. If the focus is no longer situated on the surface being scanned as a result of changes in profile of the surface, the light beam is refocused by an automatic focusing circuit. In this way, three-dimensional image information can also be obtained. Moreover, many other methods are known from practice, with which two-or three-dimensional image information can be obtained.

In almost all scanning methods, the scanning device, or at least parts of the scanning device, or the object itself are moved. Because of this, the objects being scanned can be better and more precisely scanned. Distortions by imprecise imaging of the employed optics in different areas or by scanning the surface from different spatial angles can therefore be avoided. The scanning device is then mostly moved along a plane, a cylindrical surface, a spherical surface or other geometric shapes.

A common feature of all known scanning methods is that, because of the other occurring distortions, the beam path that scans the object must be aligned perpendicular to the scanning layer. In the first place, this is achieved in that the object is positioned and aligned extremely precisely. In the second place, the plane of movement of the scanning device must be adjusted very precisely to the position of the scanning layer. Because of this, the positioning and alignment of the object and control of the scanning device, however, are extremely demanding.

The underlying task of the present invention is to configure and modify a method of the type just mentioned, so that the simplest possible generation of image information with high precision is made possible with the simultaneous, simplest possible operability of the employed device. A situation is also to be achieved, in which the best possible image information is obtained. In particular, image information suitable for depiction as true to nature as possible of the recovered image information in a two-dimensional representation is to be produced.

The aforementioned task is solved according to the invention by the features of claim 1. Accordingly, the method at issue is characterized by the fact that the beam path that scans the object is oriented at an arbitrary angle to the scanning layer and/or that the scanning layer is chosen at an arbitrary position relative to the object being scanned.

In the method according to the invention it was initially recognized that, departing from the procedure in the scanning that is known from practice, precise positioning of the object or adjustment of the movement of the scanning device with reference to the position of the object can largely be dispensed with. It was recognized, in particular, that a beam path (observing) scanning an object need not be chosen perpendicular to the scanning layer. Instead it is possible to align the beam path with reference to the surface of the object being scanned, so that it has an arbitrary angle (height angle and angle of taper) relative to the scanning layer. Because of this, a precise alignment of the object being scanned can be avoided surprisingly simply and the scanning result optimized. By arbitrary selection of the angle between the scanning beam path and the scanning layer, it is also possible to bring the scanning layer into a relatively arbitrary position with reference to movement of the scanning device. The position of the scanning layer is no longer dependent on the position of the scanning device, so that the scanning beam path must necessarily be aligned perpendicular to the scanning layer. This additionally avoids a situation, in which the scanning device must be aligned, so that the scanning beam path always falls on the object perpendicular to the scanning layer. Movement of the scanning device is now independent of the geometric circumstances. Because of this, the scanning process can occur independently of positioning of the object being scanned. The scanning layer can be influenced arbitrarily during the scanning process. By oblique scanning of the object, distortions do occur in the image information. However, these can be effectively eliminated or at least significantly reduced by subsequent image processing, which is generally necessary anyway. In particular, by oblique scanning for a two-dimensional depiction, a comparatively true to nature three-dimensional impression can already be achieved.

The term object in this context means a general geometric three-dimensional structure. An object here can refer to one or more surfaces, one or more bodies and/or a space. It is only essential that an object be bounded by surfaces that are scannable. These surfaces can be flat, curved, structured or configured in some other way.

The method according to the invention can be used in conjunction with recording of a three-dimensional color object with respect to two-dimensional image information. This two-dimensional recording yields information concerning the color, color blending and color contrasts of the object being scanned. For this purpose, a wide variety of methods known from practice are available. The use of digital cameras is referred to merely as an example. It is often essential here that the color, the color blending and the color contrasts be imaged as close to the original as possible. For this purpose, the use of color management (for example, ICC profiles) can be necessary. Depending on the application, however, black/white or half-tone images can suffice as two-dimensional image information.

In this context, it is pointed out that the term "color" here is to be understood generally. In particular, black, white and halftones are to be included by the term "color." They ultimately represent "degenerated" colors that have no color saturation.

The method according to the invention can also find use in conjunction with three-dimensional scanning of objects. The purpose of three-dimensional scanning is to acquire information with reference to the relief or height profile of the object. For this purpose, all methods for three-dimensional recording of objects known from practice are conceivable, in principle. Depending on the desired area of application, however, individual methods can be better suited than others. Triangulation methods, for example, yield information on the height profile of the object relatively quickly and simply, but occasionally are unsuited, because of their limited resolution and because of the need for appropriate and precise camera alignment. Laser scanning methods do not have this drawback, but can only furnish restricted depth resolution, because of the travel time measurement. Confocal measurement systems are again advantageous here, which, however, have only limited measurement range and are extremely slow, depending on the embodiment. This list (merely to be viewed as an example and incomplete) shows that an appropriate scanning method must be chosen, depending on the requirements on the obtained three-dimensional image information.

Scanning of the object can occur, in the first place, merely with respect to two-dimensional or merely with respect to three-dimensional information. In the second place, a combination of two-dimensional and three-dimensional scanning is conceivable. In the latter case, scanning could occur simultaneously or at least largely simultaneously. For this purpose, the scanning device would have to have two appropriate scanning heads, which can be moved over the object. On the one hand, the two scanning heads could scan, independently of each other, and in this case, advantageously at different sites on the object. On the other hand, the two scanning heads can be arranged next to each other, so that they scan adjacent points or areas of the object, or even the same point or area, through appropriate measures. As an alternative to simultaneous or largely simultaneous generation of two-and three-dimensional image information, the two-and three-dimensional scannings can occur in succession.

Both in two-dimensional and three-dimensional scanning of the object, the angle between the scanning beam path and the scanning layer and the position of the scanning layer are subject to certain constraints. Thus, the angle between the scanning beam path and the scanning layer can be chosen relatively arbitrarily, but, in general, not too small. The smaller the angle, the thinner the scanning layer turns out in general, so that the scannable depth range is very restricted. However, application areas are also conceivable here, in which sufficiently good results can be achieved or even desired effects obtained even with very flat angles. Some angles of taper could also be better suited than others. This will especially be the case when the object or structures have a preferred direction on the surface of the object, like the grain of wood, for example.

Likewise, the position of the scanning layer is generally to be chosen, so that recovery of image information is still adequately guaranteed. Thus, an attempt is often made to place the scanning layer essentially congruent with or at least parallel to the surface of the object. If the object has structured surfaces or a complicated geometric structure, the scanning layer is generally chosen, so that the surface of the object being scanned is contained in the scanning layer. Here again, however, depending on the application, other combinations are achievable. Thus, the blurriness produced by a tilted scanning layer in one or many areas can be desired.

Through the free choice of angle between the scanning beam path and the scanning layer, during use of a scanner having a detector array or cluster, partially overlapping images that do not lie in one plane and are tilted with reference to the scanning layer are formed. Consequently, the individual partial images must be equalized, so that they can be combined to a common image. For this purpose, a telecentric optics can be used, which equalizes the distortions by oblique scanning already during generation of the image information. Because of this, equally large lengths appear equally long already on the individual partial images. However, the partial images could also be equalized by subsequent image processing. Moreover, the variety of methods known from practice is available.

During the scanning process, the scanning device, or at least parts of the scanning device, or the object itself is moved. Depending on the type of object being scanned, movement could then occur in different ways. Thus, the scanning device could be guided on a meandering path in a plane, in which the scanning beam path is oriented away from the plane. However, movement along a spherical surface or other geometric structure could also be used. The scanning device, however, is preferably movable in a three-dimensional movement along a Cartesian coordinate system. The movement could occur, in particular, along freely moving x, y, z axes.

To achieve the simplest possible combining of individual partial images, it is useful to keep the two values during movement of the scanning device constant, once the position of the scanning layer is defined and once the angle between the scanning beam path and scanning layer is defined. Because of this, the lowest demands are produced during combining of partial images. However, this is not absolutely necessary. Here again, applications would be conceivable that exploit precisely this effect.

Because of movement of the scanning device, parts of the scanning device or the object itself, during use of detector arrays, several partial images are produced. The partial images are preferably defined, so that they overlap. Overlappings of up to 90% and more can then be useful. In very many applications, however, an overlap on the order of 50% to 75% will lead to good results.

It is generally necessary for execution of the scanning process to illuminate the object being scanned during the scanning process by means of an active and/or passive illumination device. A wide variety of devices known from practice can be used as illumination device. For example, a semispherical or linear emitter could be used. At the same time, the illumination device could also be constructed from several illumination elements. For example, a row or array of LEDs (light-emitting diodes) could be used, which form an emitter with complex geometry according to the Huygens principle. By the illumination device, parallel-directed light, light coming from all or several spatial angles, point-like illuminating light or the like could be generated.

The illumination device is preferably moved during movement of the scanning device or movement of the moving parts of the scanning device. The illumination device can then be connected to the scanning device. On the other hand, however, it is possible that the illumination device is movable independently of the scanning device. The illumination device could then cover essentially the same or at least similar paths as the scanning device. However, here again, it is also possible to achieve special illumination by a movement independent of the scanning device.

The illumination intensity and/or direction of the illumination device could be kept constant during movement of the illumination device. Because of this, the object being scanned would be illuminated particularly uniformly, so that images particularly true to nature in terms of color, color blending and color contrasts are produced. In many objects being scanned, for example, with very different height profiles, the illumination intensity could also be adjusted to the object being scanned as a function of the corresponding position. In the extreme case, only individual spatial angles could then be illuminated. This could be achieved particularly simply in an emitter designed according to the Huygens principle. For example, if the individual partial light sources are arranged in a hemisphere with emission in the direction of the interior of the sphere, a specific spatial direction of illumination can be established by deliberate switching-on, switching-off or generally influencing the illumination power of individual partial light sources. Illumination in all cases can be continuous or pulsed.

In objects that have a pronounced height profile, so that a scanning layer is not sufficient to record the image information, several scanning layers could be formed. The object in each scanning layer could then be scanned with a high quantization (number of height steps). Since the images for two-dimensional and three-dimensional scanning are prospectively strictly parallel, the individual images are always congruent. Consequently, both the individual two-and three-dimensional scannings, as well as the scannings over several scanning layers, can be combined congruently. This is particularly advantageous in oblique scanning, since during the use of detector arrays, staggered partial images can be joined precisely one into the other. Only adjustments as a result of distortions are necessary. The image information can be suitably added in the area of individual scanning layers, especially during three-dimensional scanning.

During scanning of an object along several scanning layers, the scanning layers can lie relatively arbitrary to each other. The individual layers need not necessarily run parallel. They could also cross in arbitrary fashion and at arbitrary sites. Advantageously, especially because of simple combining of image information along the individual scanning layers, the scanning layers, however, are aligned parallel to each other. The term "parallel" can also be transferred to scanning layers that include a spherical surface, part of a cylindrical surface, an ellipsoid or the like. The individual scanning layers, for example, during an embodiment along a spherical surface, could have the same center point and only a different radius.

With respect to the most comprehensive possible coverage, the individual scanning layers could be chosen, so that adjacent scanning layers overlap in the height direction. This guarantees that the entire object is scanned and no gaps are present in the scanned image information. If the smallest possible multiple scanning occurs, the scanning layers can be chosen, so that adjacent scanning layers only touch or intersections are only permitted in the context of measurement inaccuracy. As an alternative or in addition, the scanning layers, however, could also directly abut each other, i.e., the two abutting scanning layers could lie in one plane. In the individual layers, scanning could then occur in different ways, like with different resolution or different scanning methods.

The transition from scanning in one scanning layer to scanning in another scanning layer can occur in different ways. In the first place, the scanning device could be displaced by a corresponding distance, so that the scanning device is situated closer or farther away from the object. On the other hand, by optical means, for example, an additional lens or additional lens system, the measurement range of the scanning device could be changed. All methods known from practice are available for change in the measurement range.

For a further reduction in costs during scanning, a scanning process could be involved in a specific scanning layer or a specific area of a scanning layer only when required. This means: If, during scanning of the object, a scanning layer is left, i.e., the scanned point of the object leaves the measurement range of the measurement device or the area, in which sufficient depth sharpness is still present, a scanning process could be initiated in the adjacent scanning layer. If the demands are to be even further reduced, the area, in which the object contains parts of the corresponding scanning layer, could be determined. This can occur, on the one hand, by determining the areas, in which a scanning layer was left. On the other hand, these areas could also be established by a first rough scanning process over the entire body or manually. Scanning layers could then be scanned only in these areas. In this way, an object can be scanned successively and in layers.

The formation of several scanning layers and control of the scanning process can be used, both during three-dimensional and two-dimensional scanning of the object. During recording of the object with respect to color, it can happen that points of the object lie outside the depth sharpness range of the scanner and the depth sharpness range should therefore be expanded. Here again, the aforementioned methods are applicable, accordingly. If only the areas of a scanning layer are scanned, in which the object actually extends, the three-dimensional information can be used to control a scanning process. However, manual definition or establishment of the areas being scanned by a rough scan can also be used here.

The image information generated in this way can be further equalized with subsequent image processing. For equalization, digital filters are generally used, which compensate or reduce the distortions. Methods known from practice are available for this purpose. In particular, however, the methods described below can be used, even if the following sections show the filter in conjunction with generation of a two-dimensional depiction. The filters are also independently usable from generation of a two-dimensional representation on the two-and/or three-dimensional image information.

A two-dimensional representation, which is suitable for output of image information via a printing device, can be generated from the two-and three-dimensional image information recovered in this way and processed under some circumstances. The two-dimensional image information could be combined with the three-dimensional information, so that an additionally improved three-dimensional impression of the calculated representation forms. For this purpose, digital filters could be used, which carryout equalization, distortion, low pass, band pass, high pass or free filtering in the frequency range (for example, FFT (fast Fourier transformation) range), preferably on the three-dimensional data of the shape. On the other hand, the three-dimensional information could be used to calculate a virtual space illumination by deliberate brightening and darkening. The three-dimensional impression can then be readily achieved, if the three-dimensional information was recorded without influence by color and the two-dimensional image information without influence by shape.

The combination of three-dimensional image information with two-dimensional image information is used, for example, in the method known as 6 to 5 scan. In this case, the six measured coordinates of a point (3× color plus x-, y-and z-coordinates) are converted to five coordinates (3× color plus x-and y-coordinates, without z-coordinate). The height information is expressed essentially with brightness values.

To generate a three-dimensional impression, different means are available. In the first place, for physiological adjustment of the height information, sharply different arc lengths can be compressed with different intensity. Long arcs appear less rounded to a viewer than short arcs. This effect could be correspondingly compensated. For this purpose, the structures are equalized as a function of local frequency, in which case digital filters with a low pass, band pass or high pass filtering are used for this purpose. However, equalization or distortion filters can be used over the entire frequency range (filter with FFT (fast Fourier transformation)).

In the second place, deliberate non-linear distortions can be carried out. For example, by distorting the shape or function of the shape, the visual impression of the two-dimensional representation can be changed. Flat surfaces become round and blunt bodies sharp or vice versa. For this purpose, the shape-to-shade method known from practice can be used. Not only can the height information then be used, but also its derivatives. Slopes and convex or concave surfaces can be worked out with it.

As another means, the color of the virtual object can be darkened or brightened as a function of shape and illumination. In this way, a virtual space illumination is formed, which reproduces the natural space illumination. The space illumination, however, can advantageously be altered arbitrarily in a computer and a variety of illumination directions, intensities and patterns tested or light sources added on. No new recordings are necessary for this purpose.

Different height images or functions of height can also be overlapped. It is not of particular significance here, in which manner the information is obtained or how the image information was filtered.

In addition, the height information can be used for deliberate control of the appearance of positively or negatively curved surfaces. Within a masked area, the perceived slope can be deliberately influenced, using three-dimensional image information. For example, during representation of structures with a symmetric structure, this can be used. Ordinarily, such structures (for example, in wood) are perceived convex or concave as a function of the viewing or illumination angles. This can be suppressed by deliberate distortion of the symmetry of the structure.

The above list of possible filterings, to be viewed as incomplete, shows how the information recovered by oblique scanning can be deliberately influenced. In particular, despite distortions that develop from scanning under an arbitrary angle to the scanning layer, it is possible to achieve a very good three-dimensional impression of the displayed two-dimensional representation.

There are now different possibilities of configuring and modifying the teachings of the present invention advantageously. On the one hand, the claims subordinate to claim 1 and, on the other hand, the explanation of some practical examples of the invention can be referred to for this purpose.

The method according to the invention can be used in conjunction with a pure color image scan. In this case, the color and shape are simultaneously recorded by a common illumination device. The scanning layer, the spatial illumination angle and angles (height and angle of taper) of the scanning beam path are freely adjustable with reference to the scanning layer. The illumination body or bodies can include active or passive emitters and have any shape, for example, a hemisphere or plane. However, arbitrary emitter shapes can also be constructed according to the Huygens principle as an addition of small elementary light sources. The light sources are arranged in small dimensions and spacings relative to each other. The illumination device is configured with the scanning device and can emit continuous or pulsed light. Such a scanning method is used, for example, in the recording of wood decor, and is characterized by a relatively rapid scanning process.

In addition, a pure three-dimensional recording of the object can occur. The object is scanned pointwise or in a raise or points. Here again, the angle of the scanning beam path is oriented arbitrarily relative to the scanning layer. This embodiment of the invention can be used to generate data to produce embossing rolls.

Two-dimensional and three-dimensional image information can also be recorded separately (6 to 5 scanner). By means of a scanning head, the color, color blending and color transits (i.e., the two-dimensional image information) can be recorded, while an additional measurement head scans the shape of the object—the three-dimensional information. In this way, base data for three-dimensionally appearing and more sharply drawn two-dimensional representations can be prepared.

The invention claimed is:

1. Method for generation of image information from an object being scanned by means of a scanning device, in which the object being scanned can include one or more surfaces, at least one of one or more bodies and a space, in which the scanning device, or at least parts of the scanning device, or the object itself are moved during the scanning process, and in which the object being scanned is scanned by the scanning device in the region of a scanning layer,
wherein at least one of:
the beam path that scans the object is oriented at an arbitrary angle to the scanning layer; and
the scanning layer is chosen in an arbitrary position relative to the object being scanned; and
wherein:
a two-dimensional representation is calculated from recorded two-and three-dimensional image information; and
in the transition to two-dimensional representation, the recorded three-dimensional image information is combined with the recorded two-dimensional image information, so that a three-dimensional impression of the calculated two-dimensional representation is achieved.

2. Method according to claim 1, wherein:
the object being scanned by the scanning device is recorded with respect to two-dimensional image information, such as color, color blending and color contrasts; and
the object being scanned by the scanning device is recorded with respect to three-dimensional information, such as relief or height profile of the object, in which the scannings can be carried out simultaneously, largely simultaneously or in succession with respect to two-dimensional and three-dimensional image information.

3. Method according to claim 1, wherein the distortions that are produced by the arbitrary angle between the scanning beam path and the scanning layer are equalized by means of a telecentric optics at least one of already during the scanning process and by subsequent image processing.

4. Method according to claim 1, wherein the partial images arising because of the arbitrary angle between the scanning beam path and the scanning layer overlap.

5. Method according to claim 1, wherein the object during the scanning process is illuminated by means of an illumination device and/or the illumination device is moved with the scanning device or the moved parts of the scanning device.

6. Method according to claim 5, wherein the illumination intensity and/or illumination direction of the illumination device are kept constant during movement or adjusted as a function of the corresponding position of the illumination device with reference to the object being scanned.

7. Method according to claim 1, wherein the object is scanned along several scanning layers.

8. Method according to claim 7, wherein the scanning layers are chosen, so that adjacent scanning layers overlap or abut each other.

9. Method according to claim 7, wherein the scanning device is controlled, so that the object in a scanning layer is only scanned in the areas, in which the scanning layer is penetrated by the object.

10. Method according to claim 7, wherein the information from the scannings along the individual scanning layers is combined to common image information.

11. Method according to claim 1, wherein filters are used to calculate a correct physiological imaging of the two-dimensional representation.

12. Method according to claim 11, wherein equalization or distortion of the shape is carried out by the filters, especially with a low pass, band pass, high pass or free filtering.

13. Method according to claim 1, wherein the colors in the two-dimensional representation are brightened or darkened based on the three-dimensional image information by virtual space elimination.

* * * * *